US010927998B1

(12) United States Patent
Crockett (10) Patent No.: US 10,927,998 B1
(45) Date of Patent: Feb. 23, 2021

(54) ROTATABLE SUPPORT STRUCTURE FOR SUPPORTING ELONGATE OBJECTS (71) Applicant: Peter A. Crockett, Argyle Township, ME (US)

(72) Inventor: Peter A. Crockett, Argyle Township, ME (US)

(*) Notice: Subject to any disclaimer, the term of this patent is extended or adjusted under 35 U.S.C. 154(b) by 0 days.

(21) Appl. No.: 16/841,551

(22) Filed: Apr. 6, 2020

(51) Int. Cl.
*A47F 3/08* (2006.01)
*A47B 49/00* (2006.01)
*A47F 5/03* (2006.01)
*A47F 5/02* (2006.01)
*A47B 3/10* (2006.01)
*A47B 46/00* (2006.01)
*F16M 11/10* (2006.01)

(52) U.S. Cl.
CPC ............. *F16M 11/10* (2013.01); *A47B 3/10* (2013.01); *A47B 46/005* (2013.01); *A47B 49/00* (2013.01); *A47B 49/002* (2013.01); *A47B 49/008* (2013.01); *A47F 3/085* (2013.01); *A47F 5/02* (2013.01); *A47F 5/03* (2013.01); *F16M 2200/021* (2013.01)

(58) Field of Classification Search
CPC ............. F16M 11/10; F16M 2200/021; A47B 46/005; A47B 49/00; A47B 49/002; A47B 49/008; A47B 46/00; A47B 63/065; A47F 5/02; A47F 5/03; A47F 3/085; A47F 3/10; A47F 5/025; A47F 3/08; A47F 5/0037; A47F 3/11; B60R 9/042; B60R 9/08; B60R 9/10; B60P 1/02; B60P 3/1066; B60P 3/10

USPC ............. 211/78, 85.7, 95, 96, 163, 70, 164, 211/1.51–1.55; 312/25, 135; 414/331.02, 414/331.04, 379; 280/414.1
See application file for complete search history.

(56) References Cited

U.S. PATENT DOCUMENTS

| 87,551 A | * | 3/1869 | Dickinson, Jr. | A47F 5/03 211/164 |
| 125,928 A | * | 4/1872 | Blake | A47F 5/02 211/78 |
| 141,064 A | * | 7/1873 | McMahon | A47F 5/03 211/164 |
| 828,926 A | * | 8/1906 | Clare | A47B 49/002 211/131.2 |

(Continued)

*Primary Examiner* — Jennifer E. Novosad
(74) *Attorney, Agent, or Firm* — Anthony D. Pellegrini (57) ABSTRACT

A rotatable support structure for supporting elongate objects, comprised of a first support structure, a second support structure, a rotatable axle, a first hub, a second hub, a plurality of first elongate support members, an equal number of second elongate support members, and a locking mechanism, where the first support structure and the second support structure support the rotatable axle, the first hub is affixed to the rotatable axle and supports the first elongate support members, the second hub is affixed to the rotatable axle and supports the second elongate support members, corresponding pairs of the first and second elongate support members support elongate objects attached thereto, and the locking mechanism prevents the rotating axle from rotating and allows the rotating axle to rotate to allow the elongate objects to be conveniently loaded and unloaded from the rotatable support structure; whereby the rotatable support structure may be configured as a watercraft transportation trailer.

17 Claims, 5 Drawing Sheets

(56) References Cited

U.S. PATENT DOCUMENTS

| | | | | |
|---|---|---|---|---|
| 919,725 A * | 4/1909 | Huffman | A47F 5/03 |
| | | | 211/131.2 |
| 1,281,105 A * | 10/1918 | Unger | A47F 5/03 |
| | | | 211/164 |
| 1,391,484 A * | 9/1921 | Lindstaedt | A47F 5/03 |
| | | | 211/28 |
| 1,487,540 A * | 3/1924 | Coker | A47F 5/03 |
| | | | 211/131.2 |
| 1,552,290 A * | 9/1925 | Fowler | A47F 5/03 |
| | | | 211/131.2 |
| 1,695,618 A * | 12/1928 | Thompson | A47F 5/03 |
| | | | 211/164 |
| 1,830,373 A * | 11/1931 | Schmidt | B60P 3/055 |
| | | | 211/164 |
| 2,829,780 A * | 4/1958 | Boor | G09F 11/18 |
| | | | 211/121 |
| 2,834,479 A * | 5/1958 | Kayton | A47F 5/03 |
| | | | 211/164 |
| 2,911,107 A * | 11/1959 | Francavillo | A47B 81/007 |
| | | | 211/78 |
| 3,055,510 A * | 9/1962 | Coates | A47F 5/03 |
| | | | 211/164 |
| 3,610,431 A * | 10/1971 | Rodden | B60P 3/1033 |
| | | | 211/207 |
| 3,674,155 A * | 7/1972 | Kessler | B25H 3/00 |
| | | | 211/1.54 |
| 3,732,829 A * | 5/1973 | Bech | A47B 63/065 |
| | | | 108/95 |
| 3,854,590 A * | 12/1974 | Dolby | A47G 23/0241 |
| | | | 211/74 |
| D258,206 S * | 2/1981 | Bourke | 47/39 |
| 4,303,283 A * | 12/1981 | Mueller | A47F 3/08 |
| | | | 108/94 |
| D264,604 S * | 5/1982 | Sussman | D11/143 |
| 4,362,459 A * | 12/1982 | Klausbruckner | F41A 9/87 |
| | | | 280/408 |
| 4,852,748 A * | 8/1989 | Burgess | B23Q 1/52 |
| | | | 211/70.6 |
| 5,039,180 A * | 8/1991 | Lemons | A47B 81/068 |
| | | | 312/267 |
| 5,042,371 A * | 8/1991 | Katz | B65B 27/083 |
| | | | 100/15 |
| 5,096,216 A * | 3/1992 | McCalla | B60P 3/1033 |
| | | | 280/414.1 |
| D329,573 S * | 9/1992 | Picard | D6/559 |
| 5,160,053 A * | 11/1992 | Graham | A47F 5/03 |
| | | | 211/164 |
| 5,167,928 A * | 12/1992 | Kelly | B01F 11/0008 |
| | | | 211/164 |
| 5,248,049 A * | 9/1993 | Murphy, Sr. | B25H 3/06 |
| | | | 211/131.2 |
| 5,269,232 A * | 12/1993 | de Lasada | A47B 63/065 |
| | | | 108/94 |
| 5,370,247 A * | 12/1994 | Handleman | B25H 3/00 |
| | | | 211/164 |
| 5,401,137 A * | 3/1995 | Nijenhuis | B65F 3/00 |
| | | | 414/679 |
| 5,468,115 A * | 11/1995 | Alvis | B60P 3/08 |
| | | | 280/414.1 |
| 5,924,580 A * | 7/1999 | Chase | A01N 1/00 |
| | | | 211/1.54 |
| 6,341,931 B1 * | 1/2002 | Bates | B65G 1/127 |
| | | | 211/1.55 |
| 6,497,541 B2 * | 12/2002 | Pawluk | B60P 3/08 |
| | | | 410/26 |
| 6,557,491 B1 * | 5/2003 | Weiser | A01K 39/014 |
| | | | 119/57.8 |
| D508,349 S * | 8/2005 | Wu | D6/680.1 |
| 7,070,196 B1 * | 7/2006 | Larsen | B60P 3/1066 |
| | | | 211/70.5 |
| 7,427,184 B1 * | 9/2008 | Vespoli | B60P 3/1033 |
| | | | 280/414.1 |
| 7,699,181 B2 * | 4/2010 | Torro | A47B 49/00 |
| | | | 211/37 |
| 7,730,663 B2 * | 6/2010 | Souvlos | A01G 31/047 |
| | | | 47/62 C |
| 7,878,341 B2 * | 2/2011 | Ming | B25H 3/025 |
| | | | 211/78 |
| 7,985,043 B2 * | 7/2011 | Cook | B62D 53/062 |
| | | | 414/426 |
| D676,685 S * | 2/2013 | Dobelbower | D6/680.1 |
| 8,950,599 B2 * | 2/2015 | Wilder | A47B 49/00 |
| | | | 211/77 |
| 8,955,699 B2 * | 2/2015 | Wilder | B25H 3/025 |
| | | | 211/77 |
| 9,061,719 B2 * | 6/2015 | Cook | B62D 63/06 |
| 9,095,210 B1 * | 8/2015 | Alspaugh | A47F 5/03 |
| 2002/0121492 A1* | 9/2002 | McConnell | B25H 3/025 |
| | | | 211/70.6 |
| 2005/0194336 A1* | 9/2005 | Wu | A47F 5/03 |
| | | | 211/164 |
| 2018/0263368 A1* | 9/2018 | Galles | A47B 81/00 |
| 2020/0101904 A1* | 4/2020 | Crockett | B60P 1/02 |

\* cited by examiner

ROTATABLE SUPPORT STRUCTURE FOR SUPPORTING ELONGATE OBJECTS

CROSS REFERENCE TO RELATED APPLICATIONS

This application is a continuation in part of and claims priority to a pending patent application U.S. Ser. No. 16/144,234, filed Sep. 27, 2018, entitled "Rotatable Support Structure For Supporting Elongate Objects", by Peter A. Crockett, which is hereby incorporated by reference.

BACKGROUND OF THE INVENTION

The invention relates generally to a support structures for supporting objects, and in particular to support structures with movable components for supporting elongate objects. A subset of support structures for supporting elongate objects includes support racks for small watercraft, such as canoes and kayaks, and trailers for transporting small watercraft.

Elongate objects are often supported on vertically oriented racks in order to maximize storage space. Vertical storage reduces the use of floor space, or allows for greater storage where floor space is limited. This concept has been extended to many different kinds of support structures. One such type is a support rack for small watercraft, such as canoes and kayaks. Canoe and kayak support racks typically incorporate a frame comprising vertical end support members, with horizontal support members supported by the vertical end support members. The watercraft are then placed onto the horizontal support members. Such a configuration may be used for stationary storage racks, or for mobile racks, such as canoe transportation trailers.

The obvious principal drawback to vertically oriented racks is that loading elongate objects onto the upper horizontal support members becomes difficult and even unsafe. For example, a canoe rack configured to store six canoes may have a top support member ten or even twelve feet above the ground. A single person cannot place a canoe onto such a high support member. Even a pair of persons would need to use ladders, with the concomitant safety issue of lifting a heavy canoe while standing on a pair of ladders. Vertical support racks have therefore been developed with movable components, whereby loading is accomplished at a low level, where even a single person can load the elongate object, and then using some mechanism to move the loaded object so that another object can be loaded from the same convenient position.

U.S. Pat. Nos. 5,468,115 and 6,497,541 attempt to solve this problem by each providing for a bi-level storage device with the upper level pivoting downward into a flat orientation for loading and unloading, then pivoting upward to an upright orientation so that a lower level can be loaded. Both of these devices are limited, though, to only two levels of supports.

U.S. Pat. No. 3,610,431 is directed to a canoe transport trailer. It provides a pair of end vertical supports with horizontal support arms attached to each. Canoes are placed onto the corresponding pair of horizontal support arms, then the arms are moved upwards on movable sleeves so that lower arms can be used to support additional canoes. This configuration, though, requires a significant amount of strength to lift a loaded horizontal arm; moreover, it is very difficult for a single person to operate, as both front and rear horizontal arms need to be raised, meaning a single operator would need to constantly move from the front to the rear of the trailer as the canoe is incrementally raised (raising a canoe to the highest position cannot be done with a single movement of just one end, but multiple alternating movements of both ends must occur).

U.S. Pat. No. 5,096,216 is also directed to a canoe transport trailer. It provides a similar structure as the device disclosed in U.S. Pat. No. 3,610,431, except that the upward movement of the horizontal support arms is performed with the assistance of a system of pulleys and cables. While this device offers an improvement over the U.S. Pat. No. 3,610,431 in that a single individual can load the device, the mechanism for raising the supports is complicated.

U.S. Pat. No. 7,427,184 is likewise directed to a canoe transport trailer. It provides a fixed vertical rack for the canoes, to which is coupled an elevator-like lift assembly. Canoes are placed onto the lift, which raises the canoes to the desired level, then the canoes are slid onto the support racks. Like the U.S. Pat. No. 5,096,216 device, the lifting mechanism is complicated.

U.S. Pat. No. 7,985,043 is directed to a carousel equipped trailer for transporting tires. The carousel assembly rotates so that pivoting shelves for holding the tires are moved from a lower loading/unloading position to a raised holding position. This configuration, though, requires powered means to rotate the carousel, and the pivoting shelves are not designed to properly retain elongate objects thereon.

It has therefore been shown that there is a need for a support structure for supporting elongate objects that is easy and safe to use, is simple in construction, and can be operated by a single person.

It is therefore an object of the present invention to provide a support structure for supporting elongate objects which utilizes space efficiently to maximize the number of elongate objects that can be supported in a minimal space.

It is yet a further object of the present invention to provide a support structure for supporting elongate objects which provides for convenient, easy, and safe loading and unloading of elongate objects.

It is yet a further object of the present invention to provide a support structure for supporting elongate objects which a single person can operate for loading and unloading of elongate objects.

It is yet a further object of the present invention to provide a support structure for supporting elongate objects which is simple in design.

It is yet a further object of the present invention to provide a support structure for supporting elongate objects which can be integrated with a trailer.

Other objects of the present invention will be readily apparent from the description that follows.

SUMMARY OF THE INVENTION

The present invention is a rotatable support structure for supporting one or more elongate objects. The rotatable support structure is comprised of a first support structure, a second support structure, a rotatable axle, a first hub, a second hub, a plurality of first elongate support members, an equal number of second elongate support members, and a locking mechanism. The first and second support structures support the rotatable axle. The first and second hubs are affixed to the rotatable axle and each hub supports the elongate support members. So configured, the elongate support members appear as spokes radially dispersed along the perimeters of the hubs, with the spokes of the first and second hubs aligned with each other. Rotation of the rotatable axle causes the hubs to rotate, with the elongate support members also rotating simultaneously with the hubs. The locking mechanism allows the rotatable axle to be locked into position relative to the first and second support structures, so that the rotatable axle is unable to rotate, and to be unlocked, so that the rotatable axle is able to rotate.

As described, the present invention is used to secure elongate objects, with each end of an elongate object being secured to a pair of corresponding elongate support members. Rotation of the rotatable axle allows different pairs of elongate support members to be moved into a convenient position (e.g., near the ground) for loading or unloading the elongate objects thereon. In the preferred embodiment, the elongate objects are watercraft, and in particular canoes and/or kayaks. Thus, for example, a watercraft is secured to a pair of corresponding elongate support members, with the bow end of the watercraft secured to a first elongate support structure and the stern end of the watercraft secured to a corresponding second elongate support structure (or vice versa). Rotation of the rotatable axle allows a watercraft so secured to the device to be moved out of the way so that another watercraft can be secured to another pair of elongate support members. Similarly, when removing watercraft from the device, rotation of the rotatable axle allows a secured watercraft to be positioned to most conveniently remove it from the device. Elongate objects other than watercraft can also be secured to the rotatable support structure, such as fuel cylinders, ladders, poles, etc.

The rotatable support structure may have an integrated base allowing it to be placed onto a flat surface, such as the ground or the floor of a building. Alternatively, the rotatable support structure may be fitted to a trailer, or even into the bed of a pickup truck. This latter configuration allows for one exemplary embodiment of the device, namely, a canoe carrier. Other embodiments of the device, for example, a kayak storage rack, are also contemplated.

Additional features and advantages of the invention will be set forth in the description which follows, and will be apparent from the description, or may be learned by practice of the invention. The foregoing general description and the following detailed description are exemplary and explanatory and are intended to provide further explanation of the invention

BRIEF DESCRIPTION OF THE DRAWING

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE PRESENT INVENTION

Figure 5:
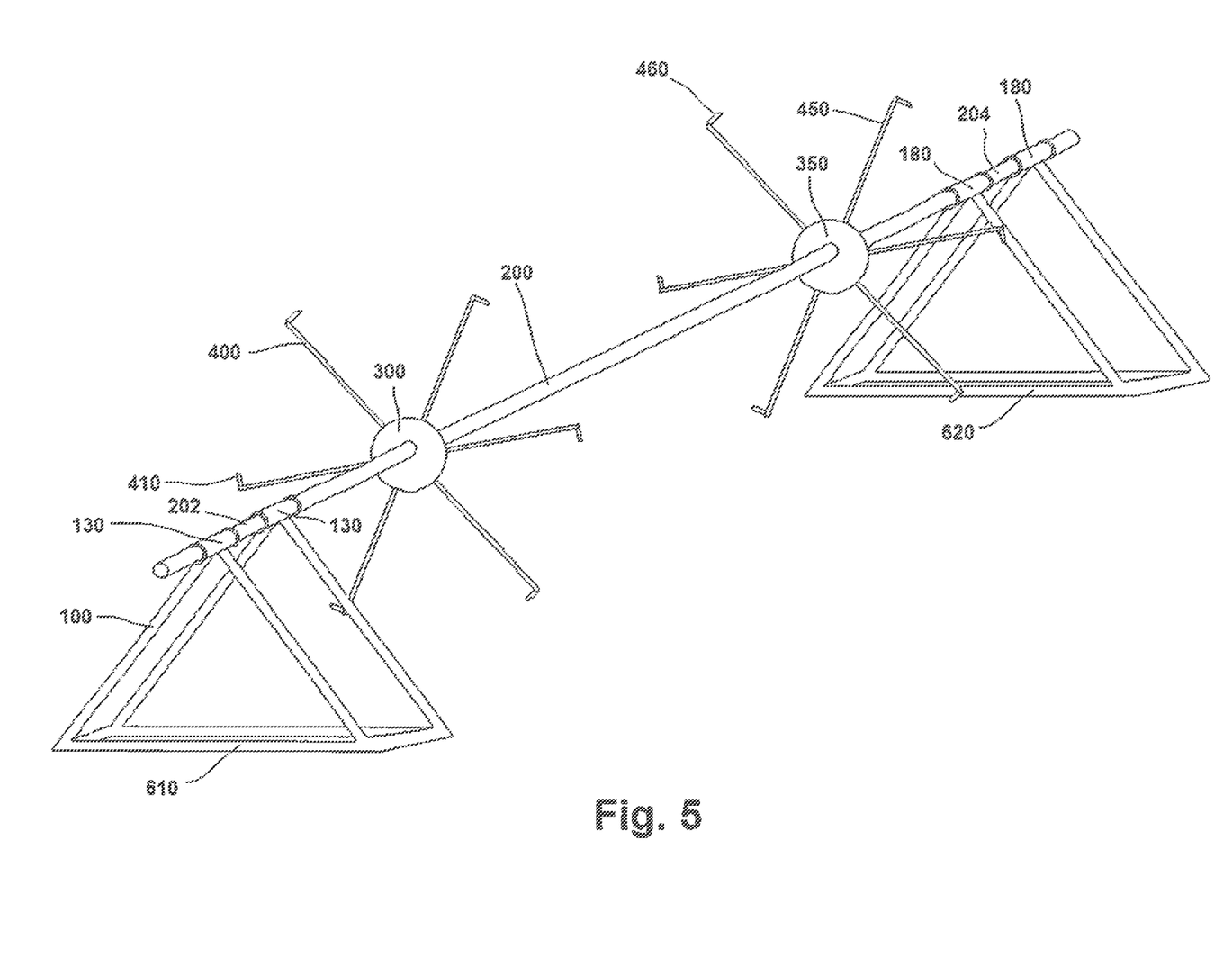
FIG. 5 is a perspective view of one embodiment of the present invention.

The rotatable support structure 1 of the present invention is comprised of a first support structure 100, a second support structure 150, a rotatable axle 200, a first hub 300, a second hub 350, a plurality of first elongate support members 400, an equal number of second elongate support members 450, and a locking mechanism 500. See FIG. 5. The first support structure 100 and the second support structure 150 support the rotatable axle 200. The first hub 300 is affixed to the rotatable axle 200 and the second hub 350 is affixed to the rotatable axle 200. The first hub 300 supports the first elongate support members 400 and the second hub 350 supports the second elongate support members 450.

In one embodiment of the present invention, the first support structure 100 is substantially rigid and has a substantially vertical orientation. It may be constructed of metal or wood or durable plastic. In the preferred embodiment it is constructed out of steel. On an upper portion of the first support structure 100 there is a means for rotatably connecting the rotatable axle 200 to the first support structure 100. The second support structure 150 is configured substantially identically to the first support structure 100.

Figure 2:
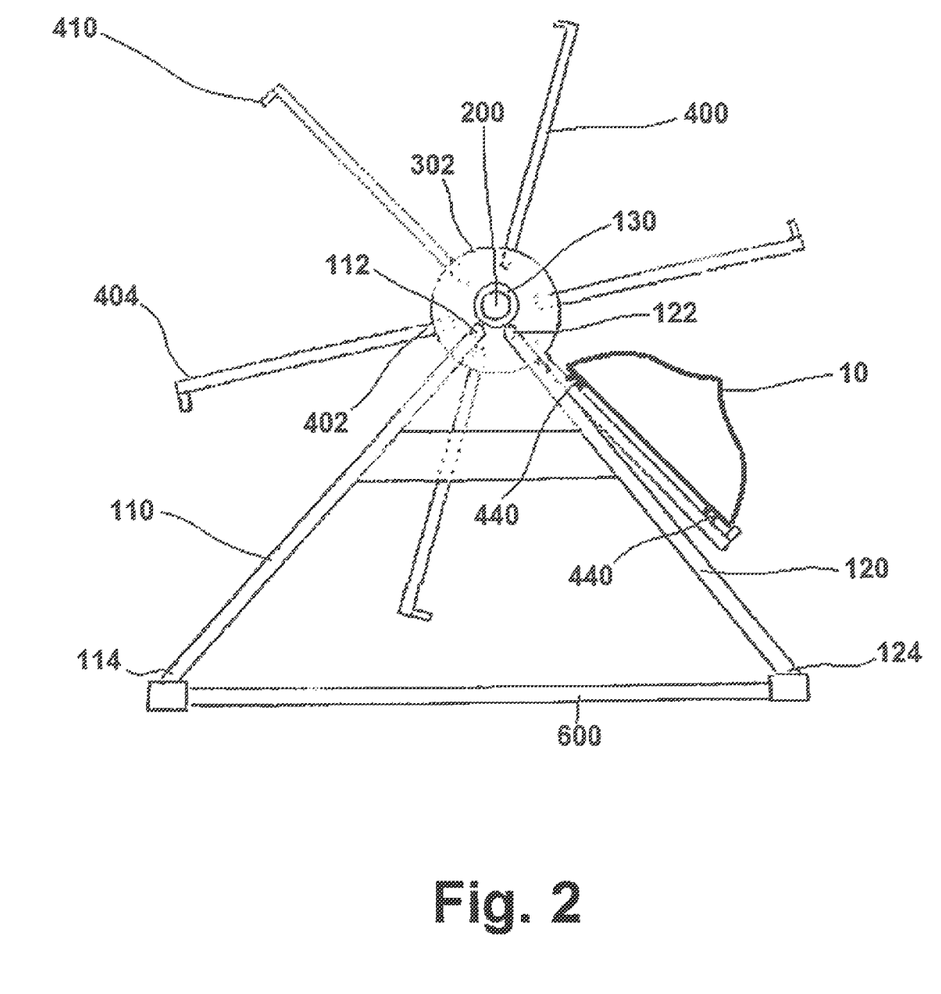
FIG. 2 is a plan front view of one embodiment of the present invention, with a canoe attached to one of the elongate support members by a pair of clips.

In one configuration of the first support structure 100, the first support structure 100 is a planar member, polygonal in shape. It may be substantially solid, or formed out of a lattice. It may have an aperture formed therethrough into which the first end 202 of the rotatable axle 200 may be inserted. In the preferred embodiment, the first support structure 100 has a first upright member 110 and a second upright member 120. See FIG. 2. The first upright member 110 of the first support structure 100 is rigid and elongate and has a first end 112 and a second end 114. It may be constructed out of hollow pipe, either having a round cross section or a rectangular cross section. The second upright member 120 of the first support structure 100 is substantially identically configured as the first upright member 110 of the first support structure 100. The first upright member 110 of the first support structure 100 is oriented at an angle to the vertical, and the second upright member 120 of the first support structure 100 is oriented at an opposite angle to the vertical, with the first end 112 of the first upright member 110 being located proximate to the first end 122 of the second upright member 120 while the second end 114 of the first upright member 110 is spaced apart from the second end 124 of the second upright member 120, resulting in the pair of upright members 110,120 forming an inverted-V. A horizontal brace may span cross the pair of upright members 110,120, adding rigidity to the structure. The second support structure 150 may likewise be formed of a pair of upright members 160,170 substantially identically configured as described above.

Figure 1:
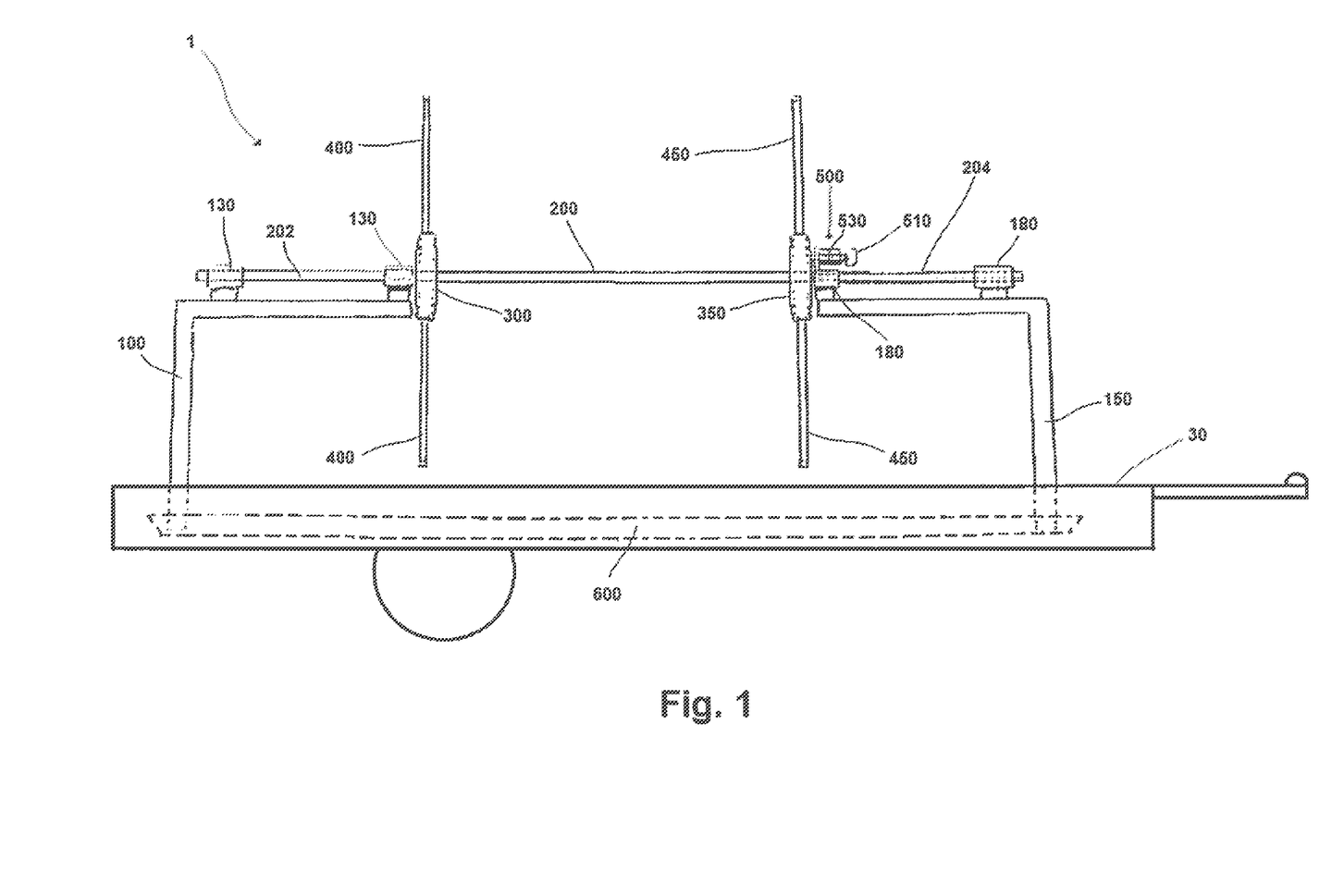
FIG. 1 is a plan side view of one embodiment of the present invention, fitted into a trailer (lower portions of the device are shown in ghost line).

In a variant of the foregoing embodiment, the first support structure 100 has a first hollow sleeve 130 affixed to an upper portion of the first support structure 100 and a second hollow sleeve 180 affixed to an upper portion of the second support structure 150. Both hollow sleeves 130,180 are opened at their ends and have substantially circular cross sections. They are oriented so that their openings are aligned with each other. The inner diameter of the first hollow sleeve 130 is slightly greater than the outer diameter of the rotatable axle 200, and the inner diameter of the second hollow sleeve 180 is slightly greater than the outer diameter of the rotatable axle 200. The first end 202 of the rotatable axle 200 is passed into and through the first hollow sleeve 130 and the second end 204 of the rotatable axle 200 is passed into and through the second hollow sleeve 180. The rotatable axle 200 thus rotates within the first and second hollow sleeves 130,180. The first and second hollow sleeves 130,180 may be made of any suitable material, such as metal, plastic, composites, or the like. In the preferred embodiment they are steel pipes. In a further variant of this embodiment, there may be a pair of first hollow sleeves 130, spaced apart from and arranged collinearly with each other, and a pair of second hollow sleeves 180, spaced apart from and arranged collinearly with each other, whereby the first end 202 of the rotatable axle 200 is passed into and through the each of the first hollow sleeves 130 and the second end 204 of the rotatable axle 200 is passed into and through each of the second hollow sleeves 180. See FIG. 1. In yet a further variant of this embodiment, the first end 112 of the first upright member 110 of the first support structure 100 and the first end 122 of the second upright member 120 of the first support structure 100 are angled ninety degrees in the same direction, such that they are oriented substantially horizontally and parallel to each other. The first hollow sleeve 130 is then placed onto the first ends 112,122 of the upright members 110,120 of the first support structure 100 and affixed thereto. Similarly, the first ends of the first and second upright members of the second support structure 150 are angled ninety degrees in the same direction and the second hollow sleeve 180 is placed onto them and affixed thereto.

The rotatable axle 200 of the present invention is elongate and substantially rigid. It has a first end 202 and a second end 204, and a substantially horizontal orientation. It is further oriented substantially perpendicular to the first support structure 100 and to the second support structure 150. The first end 202 of the rotatable axle 200 is rotatably connected to the first support structure 100 and the second end 204 of the rotatable axle 200 is rotatably connected to the second support structure 150. The rotatable axle 200 preferably has a circular cross section, though other shapes are also contemplated. In the preferred embodiment the rotatable axle 200 is constructed of steel pipe, though other materials may also be used.

Figure 4A:
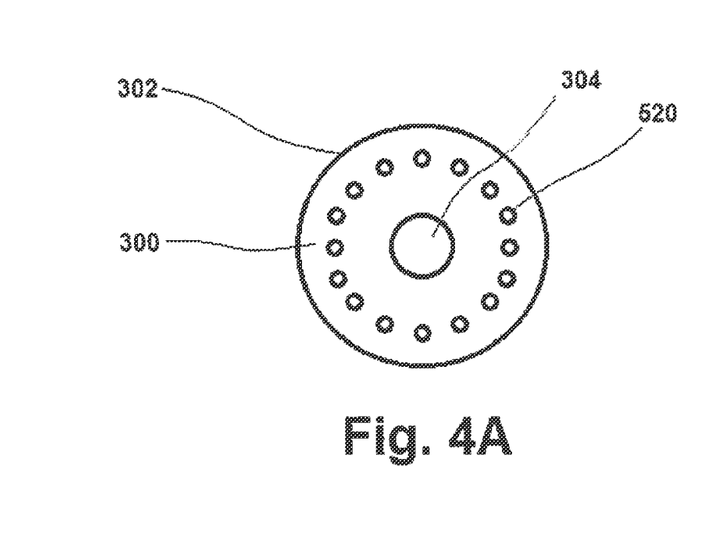
FIG. 4A is a plan front view of the first hub of the present invention.
Figure 4B:
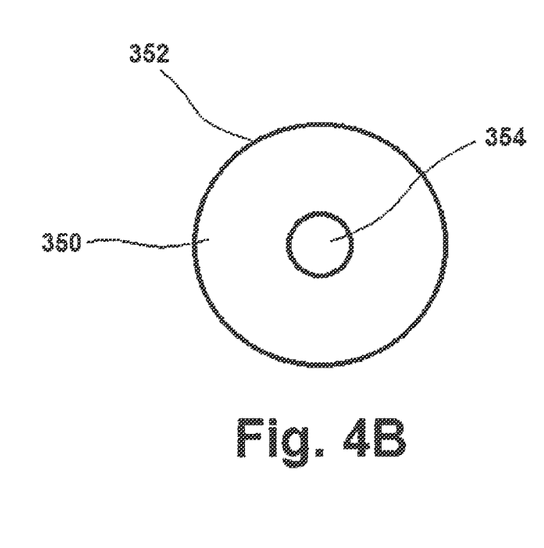
FIG. 4B is a plan front view of the second hub of the present invention.

The first hub 300 is substantially planar and has a circumferential perimeter 302 and a central aperture 304. See FIG. 4A. In a preferred embodiment the first hub 300 is circular, though it could have other suitable shapes. The central aperture 304 of the first hub 300 is configured to allow the first end 202 of the rotatable axle 200 to pass into and through the central aperture 304 of the first hub 300. The first hub 300 is fixedly attached to the rotatable axle 200 proximate to the first end 202 of the rotatable axle 200, so that the first hub 300 has a substantially vertical orientation and is oriented substantially perpendicular to the rotatable axle 200. The second hub 350 is substantially identically configured as the first hub 300, with a circumferential perimeter 352 and a central aperture 354, see FIG. 4B, and is fixedly attached to the rotatable axle 200 proximate to the second end 204 of the rotatable axle 200 in the same manner, so that the second hub 350 has a substantially vertical orientation and is oriented substantially perpendicular to the rotatable axle 200 and parallel to the first hub 300.

A plurality of first elongate support members 400 is associated with the first hub 300 and a like number of second elongate support members 450 is associated with the second hub 350. See FIG. 5. Each of the plurality of first elongate support members 400 is substantially rigid and has a first end 402 and a second end 404. Each is fixedly attached at its first end 402 to the perimeter 302 of the first hub 300 such that it extends outward from the first hub 300 in an orientation substantially perpendicular to the rotatable axle 200. Each of the first elongate support members 400 may be a rod, having a circular cross section. Preferably, each of the first elongate support members 400 has a rectangular cross section. The first elongate support members 400 may be of different lengths, but preferably they are all of the same length. The first elongate support members 400 are evenly spaced about the perimeter 302 of the first hub 300. For practical purposes, at least three first elongate support members 400 are affixed to the first hub 300, and not more than eight. In the preferred embodiment, six first elongate support members 400 are affixed to the first hub 300. Similarly, each of the second elongate support members 450 are substantially identically configured as the first elongate support members 400. The second elongate support members 450 are fixedly attached at their first ends to the perimeter 352 of the second hub 350, and are evenly spaced about the perimeter 352 of the second hub 350 in corresponding relation to the first elongate support members 400. That is, each said second elongate support member 450 corresponds with one of the first elongate support members 400 and is oriented in alignment with and parallel to that corresponding first elongate support member 400. So configured, each pair of corresponding elongate support members 400,450 is coplanar.

In one embodiment of the present invention, each of the first and second elongate support members 400,450 has a retaining projection 410,460 located proximate to its second end. Each retaining projection 410,460 is angled in relation to the elongate support member 400,450 to which it is attached, with the retaining projections 410,460 of a corresponding pair of elongate support members 400,450 having the same angle and oriented in the same direction. An object placed onto a corresponding pair of elongate support members 400,450 will be prevented from sliding off the respective second ends of the elongate support members 400,450 by the retaining projections 410,460. The retaining projections 410,460 can be of any suitable size and shape, and be made of any suitable material; in the preferred embodiment, each retaining projection 410,460 is an elongate metal stub.

Figure 3:
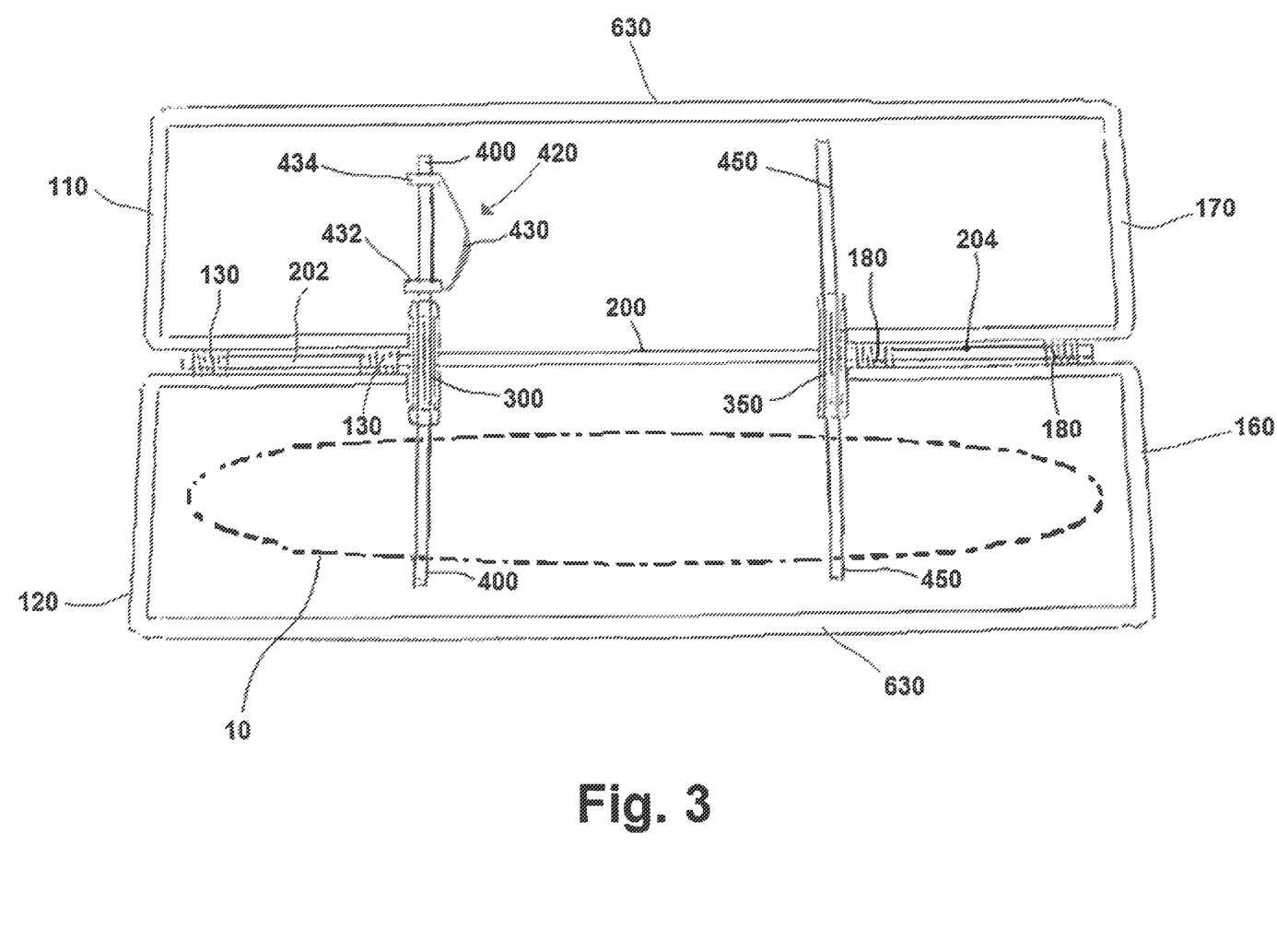
FIG. 3 is a plan top view of one embodiment of the present invention, with a canoe depicted in ghost lines attached to a pair of elongate support members.

In another embodiment of the present invention, each of the first and second elongate support members 400,450 has a retaining mechanism 420 associated with it. See FIG. 3. The retaining mechanism 420 is adapted to secure a portion of one of the elongate objects 10 to the elongate support member 400,450. In one embodiment, each retaining mechanism 420 is comprised of an adjustable strap 430, a first attachment component 432, and a second attachment component 434. The adjustable strap 430 is adapted to be affixed to the elongate support member 400,450 proximate to the first end of the elongate support member 400,450 by the first attachment component 432, and to be affixed to the elongate support member 400,450 proximate to the second end of the elongate support member 400,450 by the second attachment component 434. In one configuration, the first and second attachment components are hooks attached to the elongate support member 400,450. In another configuration, they are circular eyelets. In yet another configuration, they are pairs of slots formed into the elongate support member 400,450. Any other configuration known in the art that serves to anchor the adjustable strap 430 to the elongate support member 400,450 is also contemplated. In this embodiment, for example, a watercraft placed onto a corresponding pair of elongate support members 400,450 may have its bow end placed onto the first elongate support member 400 and secured thereto by the adjustable strap 430 of the retaining mechanism 420 associated with that first elongate support member 400, and have its stern end placed onto the second elongate support member 450 and secured thereto by the adjustable strap 430 of the retaining mechanism 420 associated with that second elongate support member 450 (of course, the bow and stern ends of the watercraft can be reversed).

In yet another embodiment of the present invention, the retaining mechanism 420 of each of the first and second elongate support members 400,450 is comprised of a pair of adjustable clips 440. One of the pair of adjustable clips 440 is affixed to the elongate support member 400,450 proximate to the first end of the elongate support member 400,450 and the other of the pair of adjustable clips 440 is affixed to the elongate support member 400,450 proximate to the second end of the elongate support member 400,450. Each clip 440 may include a pair of jaws, a biasing mechanism, such as a spring, a mechanical closure, or any combination of same, or be otherwise configured to be securable to an object. In order to accommodate differently sized objects, each pair of adjustable clips 440 may be repositioned along the elongate support member 400,450 as needed. This may be accomplished by there being multiple attachment points along the elongate support member 400,450, with the adjustable clips 440 removably attached to each attachment point as desired. Alternatively, each adjustable clip 440 may comprise a collar that can be tightened around the elongate support member 400,450 to remain in place or loosened to allow the adjustable clip 440 to be repositioned. Other mechanisms known in the art for attaching and repositioning the adjustable clips 440 are also contemplated. In this configuration, for example, a canoe placed onto a corresponding pair of elongate support members 400,450 may have the gunnels at its bow end placed onto the first elongate support member 400 and secured thereto by being clipped to the pair of adjustable clips 440 of the retaining mechanism 420 associated with that first elongate support member 400, and have the gunnels of its stern end placed onto the second elongate support member 450 and secured thereto by the adjustable clips 440 of the retaining mechanism 420 associated with that second elongate support member 450 (of course, the bow and stern ends of the canoe can be reversed).

The locking mechanism 500 of the present invention can be any device having an unlocked mode and a locked mode, wherein the locking mechanism 500 allows the rotatable axle 200 to rotate relative to the first and second support structures 100,150 when in unlocked mode, and prevents the rotatable axle 200 from rotating relative to the first and second support structures 100,150 when in locked mode. In one embodiment, the locking mechanism 500 is comprised of a locking pin 510, a plurality of pin apertures 520 formed into the first hub 300, and a pin support structure 530 fixedly attached to the first support structure 100. See FIG. 4C. The locking pin 510 is a rigid, elongate member having a first end 512 and a second end 514. The pin support structure 530 is a structure attached to the first support structure 100 and configured to retain the locking pin 510 in movable relation to the first support structure 100. The locking pin 510 is therefore able to move within the pin support structure 530 towards and away from the first hub 300. The pin apertures 520 are located in a regular pattern around the central aperture 304 of the first hub 300, with each of the pin apertures 520 located an equal distance from the central aperture 304 of the first hub 300 as each other pin aperture 520. See FIG. 4A. The first end 512 of the locking pin 510 is configured to be inserted into each of the pin apertures 520, one at a time, and to be withdrawn from each of the pin apertures 520. In this configuration, the locking mechanism 500 is placed into locked mode by rotating the first hub 300 until one of the pin apertures 520 is aligned with the first end 512 of the locking pin 510, then moving the first end 512 of the locking pin 510 into that pin aperture 520. The locking mechanism 500 is placed into unlocked mode when the first end 512 of the locking pin 510 is withdrawn from a pin aperture 520.

Figure 4C:
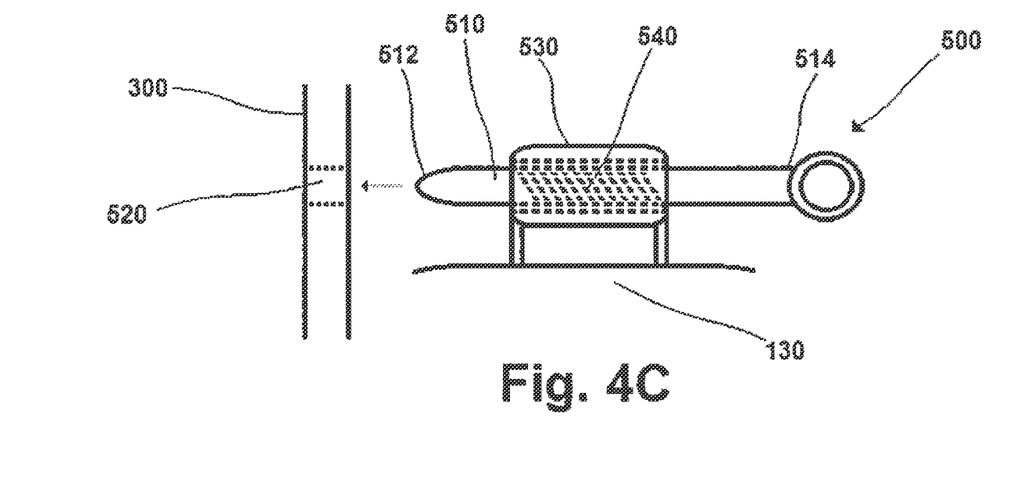
FIG. 4C is a plan side view of one embodiment of the locking mechanism, depicting a biasing spring in ghost lines.

The locking mechanism 500 may also comprise a biasing spring 540. The biasing spring 540 is configured to move the first end 512 of the locking pin 510 towards the first hub 300. Thus, to remain in unlocked mode, the first end 512 of the locking pin 510 must not be aligned with any of the pin apertures 520 or inserted therein. As the first hub 300 is rotated, the first end 512 of the locking pin 510 is pressed against the first hub 300 and drags along its surface. Once the rotation of the first hub 300 causes the first end 512 of the locking pin 510 to become aligned with a pin aperture 520, the biasing spring 540 automatically moves the first end 512 of the locking pin 510 into the pin aperture 520 and the locking mechanism 500 enters locked mode. A handle or lanyard may be attached to the second end 514 of the locking pin 510 to facilitate drawing the locking pin 510 away from the first hub 300, either to place the locking mechanism 500 in unlocked mode or to ensure that the locking mechanism 500 remains in unlocked mode as the first hub 300 is rotated, notwithstanding any alignment of the first end 512 of the locking pin 510 with any pin aperture 520. Similarly, the second hub 350 can also be configured with a locking mechanism 500 as described above, in all of its variants.

In one embodiment of the present invention, the rotatable support structure 1 further comprises a base 600. See FIG. 3. The base 600 is adapted to support the rotatable support structure 1 on a substantially flat surface, such as the ground, a parking area, or the floor of a building. The base 600 is attached to the first support structure 100 and to the second support structure 150. In one embodiment, the base 600 is divided into two subcomponents, a first base component 610 attached to the first support structure 100 and a separate second base component 620 attached to the second support structure 150. See FIG. 5. Each base component 610,620 may be planar, or have radially dispersed supports, or have a vertical anchor member for inserting into the ground, or be otherwise configured in any manner known in the art in order to provide support to the first and second support structures 100,150 to maintain them in an upright position. In a preferred embodiment, the base 600 is a continuous structure joining the first and second support structures 100,150 to each other, thereby providing additional rigidity to the rotatable support structure 1. In a variant of this embodiment, where the first support structure 100 has a first upright member 110 and a second upright member 120, as described above, the second ends 114,124 of the first and second upright members 110,120 are angled ninety degrees, such that they are oriented substantially horizontally. Similarly, the second ends of the first and second upright members 160,170 of the second support structure 150 are angled ninety degrees. The second ends 114,124 of the upright members 110,120 of the first support structure 100 are joined by elongate base members 630 to the second ends of the upright members 160,170 of the second support structure 150, with the elongate base members 630 and the second ends of the upright members 110,120,160,170 forming the base 600 of the rotatable support structure 1. See FIG. 3.

In another embodiment of the present invention, the rotatable support structure 1 is placed onto a trailer 30. See FIG. 1. The first support structure 100 and the second support structure 150 may be secured to the bed of the trailer 30. Alternatively, the rotatable support structure 1 may have a continuous base 600 as described above, and then the base 600 is secured to the bed of the trailer 30. The trailer 30 can be any type of utility trailer capable of being towed by a motorized vehicle. Similarly, the rotatable support structure 1 may be placed into the bed of a pickup truck.

In yet another embodiment of the present invention, the rotatable support structure 1 may comprise a motor. The motor is configured to cause the rotatable axle 200 to rotate. Any suitable motor known in the art, coupled with any suitable linkage to the rotatable axle 200, can be used for this purpose. In one example, the motor can be an electric motor that can be plugged into a standard electrical outlet. In another example, the motor can be an electric motor that can be plugged into a vehicle power port connected to a car battery, such as may be found on a tow vehicle. In yet another example, the motor can be an electric motor powered by a portable battery. The motor may be directly attached to one end of the rotatable axle 200, or it might be connected to the rotatable axle 200 by a series of gears, pulleys, cables, or any other means known in the art. The motor may be unidirectional, rotating the rotatable axle 200 in one direction only, or bidirectional, rotating the rotatable axle 200 in both directions. The motor may also act as the locking mechanism 500, whereby when the motor is not rotating the rotatable axle 200 the device 1 is in locked mode, and when the motor is rotating the rotatable axle 200 the device 1 is in unlocked mode.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A rotatable support structure for supporting one or more of elongate objects, each said elongate object having a first portion and a second portion, said support structure comprised of
    a first support structure, a second support structure, a rotatable axle, a first hub, a second hub, a plurality of first elongate support members and an equal number of second elongate support members, and a locking mechanism;
    said first support structure being substantially rigid and having a substantially vertical orientation;
    said second support structure being substantially rigid and having a substantially vertical orientation and being spaced apart from and substantially parallel to the first support structure;
    said rotatable axle being elongate, monolithic, and substantially rigid and having a first end and a second end, and having a substantially horizontal orientation, and being oriented substantially perpendicular to the first support structure and to the second support structure, with the first end of said rotatable axle being rotatably connected to the first support structure and the second end of said rotatable axle being rotatably connected to the second support structure;
    said first hub being substantially planar and having a circumferential perimeter and a central aperture, said central aperture of the first hub configured to allow the rotatable axle to pass into and through said central aperture of the first hub, said first hub fixedly attached to the rotatable axle proximate to the first end of the rotatable axle, said first hub having a substantially vertical orientation and being oriented substantially perpendicular to the rotatable axle;
    said second hub being substantially planar and having a circumferential perimeter and a central aperture, said central aperture of the second hub configured to allow the rotatable axle to pass into and through said central aperture of the second hub, said second hub fixedly attached to the rotatable axle proximate to the second end of the rotatable axle, said second hub having a substantially vertical orientation and being oriented substantially perpendicular to the rotatable axle and parallel to the first hub;
    each of said plurality of first elongate support members being substantially rigid and non-articulating, such that no portion of any said first elongate support member moves relative to any other portion of said first elongate support member, and having a first end and a second end, and being fixedly attached at its first end to the perimeter of the first hub such that it extends outward from the first hub in an orientation substantially perpendicular to the rotatable axle;
    each of said second elongate support members being substantially rigid and non-articulating, such that no portion of any said second elongate support member moves relative to any other portion of said second elongate support member, and having a first end and a second end, and being fixedly attached at its first end to the perimeter of the second hub such that it extends outward from the second hub in an orientation substantially perpendicular to the rotatable axle, with each said second elongate support member corresponding with one of the first elongate support members and oriented in alignment with and parallel to said corresponding first elongate support member; and
    said locking mechanism having an unlocked mode and a locked mode, wherein said locking mechanism is configured to allow the rotatable axle to rotate relative to the first and second support structures when in the unlocked mode, and said locking mechanism is configured to prevent the rotatable axle from rotating relative to the first and second support structures when in the locked mode;
    whereby each of the first elongate support members is configured to have the first portion of one of the elongate objects attached directly thereto, and
    each of the second elongate support members is configured to have the second portion of one of the elongate objects attached directly thereto; such that said elongate object is entirely supported upon the seconds ends of an associated pair of first and second elongate support members without need for any intervening structure therebetween.

2. The rotatable support structure of claim 1 wherein the rotatable axle has a circular cross section.

3. The rotatable support structure of claim 2 wherein
the first support structure has affixed thereto a first hollow sleeve being opened at its ends and having a substantially circular cross section, said first hollow sleeve configured to allow the first end of the rotatable axle to pass into and through said first hollow sleeve; and
the second support structure has affixed thereto a second hollow sleeve being opened at its ends and having a substantially circular cross section, said second hollow sleeve configured to allow the second end of the rotatable axle to pass into and through said second hollow sleeve.

4. The rotatable support structure of claim 2 wherein
the first support structure has affixed thereto a pair of first hollow sleeves, each first hollow sleeve being opened at its ends and having a substantially circular cross section, said pair of first hollow sleeves spaced apart from and arranged collinearly with each other and configured to allow the first end of the rotatable axle to pass into and through each of said first hollow sleeves; and
the second support structure has affixed thereto a pair of second hollow sleeves, each second hollow sleeve being opened at its ends and having a substantially circular cross section, said pair of second hollow sleeves spaced apart from and arranged collinearly with each other and configured to allow the second end of the rotatable axle to pass into and through each of said second hollow sleeves.

5. The rotatable support structure of claim 1 wherein
the first hub is substantially circular, and
the second hub is substantially circular.

6. The rotatable support structure of claim 1 wherein
the first support structure has a first upright member and a second upright member, and the second support structure has a first upright member and a second upright member,
with the first upright member of the first support structure being rigid and elongate and having a first end and a second end,
the second upright member of the first support structure being rigid and elongate and having a first end and a second end,
the first upright member of the second support structure being rigid and elongate and having a first end and a second end, and
the second upright member of the second support structure being rigid and elongate and having a first end and a second end;
wherein the first upright member of the first support structure is angled and the second upright member of the first support structure is angled, with the first end of the first upright member of the first support structure located proximate to the first end of the second upright member of the first support structure and the second end of the first upright member of the first support structure is spaced apart from the second end of the second upright member of the first support structure, such that the first end of the first upright member of the first support structure is closer to the first end of the second upright member of the first support structure than the second end of the first upright member of the first support structure is to the second end of the second upright member of the first support structure; and
the first upright member of the second support structure is angled and the second upright member of the second support structure is angled, with the first end of the first upright member of the second support structure located proximate to the first end of the second upright member of the second support structure and the second end of the first upright member of the second support structure is spaced apart from the second end of the second upright member of the second support structure, such that the first end of the first upright member of the second support structure is closer to the first end of the second upright member of the second support structure than the second end of the first upright member of the second support structure is to the second end of the second upright member of the second support structure.

7. The rotatable support structure of claim 1 wherein
the entirety of each of the first elongate support members is a non-articulating rod, such that no portion of any said rod moves relative to any other portion of said rod, and
the entirety of each of the second elongate support members is a non-articulating rod, such that no portion of any said rod moves relative to any other portion of said rod.

8. The rotatable support structure of claim 7 wherein
the entirety of each of the first elongate support members has a circular cross section, and
the entirety of each of the second elongate support members has a circular cross section.

9. The rotatable support structure of claim 7 wherein
the entirety of each of the first elongate support members has a rectangular cross section, and
the entirety of each of the second elongate support members has a rectangular cross section.

10. The rotatable support structure of claim 1 wherein
each of the first elongate support members has located proximate to its second end a retaining projection, and
each of the second elongate support members has located proximate to its second end a retaining projection.

11. The rotatable support structure of claim 10 wherein
each of the first elongate support members has associated therewith a retaining mechanism adapted to secure the first portion of one of the one or more elongate objects to said first elongate support member, wherein each said retaining mechanism is distinct from the retaining projection associated with each said first elongate support member, and
each of the second elongate support members has associated therewith a retaining mechanism adapted to secure the second portion of said elongate object to said second elongate support member, wherein each said retaining mechanism is distinct from the retaining projection associated with each said second elongate support member.

12. The rotatable support structure of claim 11 wherein
the retaining mechanism associated with one of the first elongate support members is comprised of an adjustable strap, a first attachment component, and a second attachment component, with said adjustable strap adapted to be affixed to said first elongate support member proximate to the first end of said first elongate support member by said first attachment component, and said adjustable strap adapted to be affixed to said first elongate support member proximate to the second end of said first elongate support member by said second attachment component, and
the retaining mechanism associated with the second elongate support member corresponding to said first elongate support member is comprised of an adjustable strap, a first attachment component, and a second attachment component, with said adjustable strap adapted to be affixed to said second elongate support member proximate to the first end of said second elongate support member by said first attachment component, and said adjustable strap adapted to be affixed to said second elongate support member proximate to the second end of said second elongate support member by said second attachment component.

13. The rotatable support structure of claim 11 wherein the retaining mechanism associated with one of the first elongate support members is comprised of a pair of adjustable clips, one of said pair of adjustable clips adapted to be affixed to said first elongate support member proximate to the first end of said first elongate support member and the other of said pair of adjustable clips adapted to be affixed to said first elongate support member proximate to the second end of said first elongate support member, and the retaining mechanism associated with the second elongate support member corresponding to said first elongate support member is comprised of a pair of adjustable clips, one of said pair of adjustable clips adapted to be affixed to said second elongate support member proximate to the first end of said second elongate support member and the other of said pair of adjustable clips adapted to be affixed to said second elongate support member proximate to the second end of said second elongate support member.

14. The rotatable support structure of claim 1 wherein said locking mechanism is comprised of a locking pin, a plurality of pin apertures formed into the first hub, and a pin support structure fixedly attached to the first support structure;

wherein said locking pin is a rigid, elongate member having a first end and a second end, said pin support structure is configured to retain said locking pin in movable relation to the first support structure, and said plurality of pin apertures are located in a regular pattern around the central aperture of the first hub, with each said pin aperture located an equal distance from the central aperture of the first hub as each other pin aperture, with the first end of said locking pin being configured to be inserted into each of the pin apertures, one at a time, and to be withdrawn from each of the pin apertures;

whereby the locking mechanism is placed into the locked mode when the first end of said locking pin is inserted into one of the plurality of pin apertures and the locking mechanism is placed into the unlocked mode when the first end of said locking pin is not inserted into any of the plurality of pin apertures.

15. The rotatable support structure of claim 14 wherein said locking mechanism further comprises a biasing spring, wherein said biasing spring is configured to move the first end of the locking pin towards the first hub.

16. The rotatable support structure of claim 1 further comprising a base, said base adapted to support the rotatable support structure on a substantially flat surface, with said base being attached to the first support structure and attached to the second support structure.

17. The rotatable support structure of claim 1 further comprising a motor, said motor configured to cause the rotatable axle to rotate.

\* \* \* \* \*